United States Patent [19]

Evans et al.

[11] 4,190,092
[45] Feb. 26, 1980

[54] WHEEL RIM

[75] Inventors: James L. Evans, Ypsilanti; John A. Main, Plymouth, both of Mich.

[73] Assignee: Kelsey-Hayes Co., Romulus, Mich.

[21] Appl. No.: 848,048

[22] Filed: Nov. 3, 1977

Related U.S. Application Data

[63] Continuation-in-part of Ser. No. 673,736, Apr. 5, 1976, abandoned.

[51] Int. Cl.² ........................... B60C 5/00; B60B 21/00
[52] U.S. Cl. ..................................... 152/381.1; 301/97
[58] Field of Search ............... 285/239, 259; 152/378, 152/379.1, 379.2, 381.1, 381.2, 385, 386; 301/95-98

[56] References Cited

U.S. PATENT DOCUMENTS

| | | | |
|---|---|---|---|
| 1,996,855 | 4/1935 | Cheswright | 285/239 |
| 3,210,100 | 10/1965 | Lowles, et al. | 285/239 |
| 3,664,405 | 5/1972 | Polyner | 152/381.2 |
| 3,915,215 | 10/1975 | Nebout | 152/379.1 |
| 3,977,727 | 8/1976 | Glasenapp et al. | 301/97 |

FOREIGN PATENT DOCUMENTS 237156  9/1959  Australia ..................... 285/239

Primary Examiner—H. Grant Skaggs
Attorney, Agent, or Firm—Ralph J. Skinkiss

[57] ABSTRACT

A wheel rim construction that cooperates with the tire bead seat to insure retention of the tire, even under a "run flat" condition. The bead seat portion of the rim is formed with a plurality of circumferentially extending radial projections that cause gripping of the tire bead to form a mechanical interlock between the projections and wheel flange. The radial projections are formed during the roll forming of the wheel rim by extruding the rim material into grooves in the upper finishing roll so that the permanently formed projections lie radially outward of the basic rim profile.

5 Claims, 5 Drawing Figures

WHEEL RIM

RELATED APPLICATIONS

This application is a continuation in part of my copending application Ser. No. 673,736 filed Apr. 5, 1976, now abandoned.

BACKGROUND OF THE INVENTION

This invention relates to a wheel rim and method of constructing such a wheel rim that assists in seating of the tire.

A wheel rim construction should be designed to permit easy mounting of the tire, yet should also insure against movement of the tire bead relative to the wheel rim once mounted and inflated. Various wheel rim configurations have been proposed for achieving this purpose. In addition to the aforenoted desired results, the wheel rim should permit easy disassembly of the tire for servicing or replacement. Substantially all of the wheel rim constructions are a compromise to achieve all of these effects. It is also desirable for the rim to cooperate with the tire bead in such a way as to prevent the tire from leaving the rim in the event of a "run flat" condition. That is, it is desirable for the tire to remain on the rim even though it is fully deflated so that the owner may drive the vehicle to a place where it may be serviced.

U.S. Pat. No. 3,977,727 issued to William A. Glasenapp et al, teaches two ways in which a wheel rim may be modified to prevent a pneumatic tire from disengaging the rim upon the loss of air pressure. Glasenapp teaches cutting "barbs" into the tire bead seat portion of the wheel using a chisel type tool or as an alternative, cutting circumferential "knurls" into the bead seat. By both of these techniques the cutting operation removes metal from below the intended bead seat surface thereby weakening the rim structure in the bead seat region.

SUMMARY OF THE INVENTION

Our invention is adapted to be embodied in a wheel rim having an outer flange and an adjacent bead seat for supporting the bead of a tire. In such a wheel rim, out invention comprises forming at least one radial projection preferably extending completely around the circumference of the bead seat in the area engaged by the tire bead. The projection is configured to effect displacement of the tire bead rubber and lock the tire bead between the projection and the wheel flange thereby securing the tire to the wheel.

Another feature of our invention is embodied in a method for making a wheel rim having such radial projections. The method comprises positioning the wheel rim between a pair of deforming rolls for performing the final forming operation on the rim bead seat. At least one of the opposed forming rolls is provided with means to form the circumferential surface discontinuity or radial projections by displacing material from the bead seat region and extrude such material into the desired radial projection configuration.

DETAILED DESCRIPTION OF THE PREFERRED EMBODIMENTS

Figure 1:
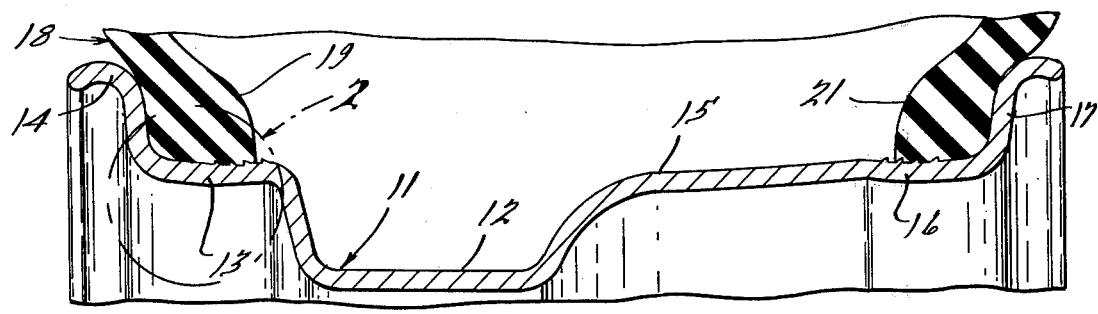
FIG. 1 is a partial cross-sectional view of a wheel rim and associated tire embodying this invention.

In the drawings, the reference numeral 11 indicates generally a drop center wheel rim embodying this invention. The wheel rim 11 includes an annular well or drop center portion 12. At the axial outer periphery of the wheel 11, a first tire bead seat portion 13 is formed, which terminates in a radially outwardly extending flange 14. At the axial inner side of the drop center 12, an elongated flange 15 is formed that terminates in a second tire bead seat portion 16. The bead seat portion 16 also terminates in a radially outwardly extending flange 17.

A pneumatic tire, preferably of the tubeless type, identified generally by the reference numeral 18, is mounted on the wheel rim 11. The tire 18 has inner and outer beads 19 and 21 that cooperate with the wheel bead seats 13 and 16, respectively.

Figure 2:
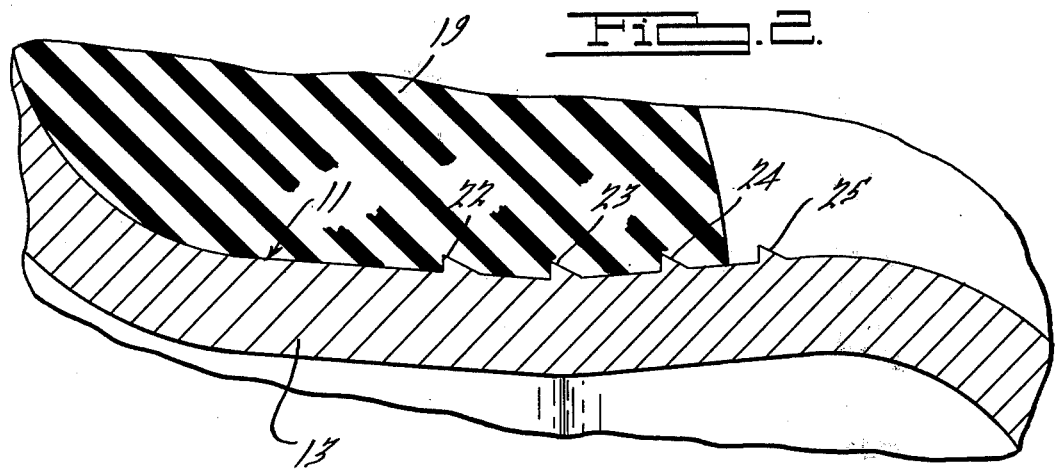
FIG. 2 is an enlarged cross-sectional view of the area encompassed by the circle 2 in FIG. 1.

In order to insure against accidental displacement of the tire bead portions 19 and 21 from the bead seats 13 and 16, an improved retention means is provided, which may be best understood by reference to FIG. 2. In FIG. 2 only the bead seat portion 13 is described and illustrated in detail. It is to be understood that the bead seat portion 16 is of substantially identical construction. The tire bead 19 has a heel portion that contacts the upper surface of the rim bead seat 13 over a substantial portion of its length. Inclined surface discontinuities preferably in the form of upstanding triangular shaped ridges 22, 23 and 24 are formed around the circumference of the portion of the bead seat 13 contacted by the tire bead 19. The ridges 22, 23 and 24 substantially have similar configurations, however may differ slightly to accommodate a variably sloped bead seat outer peripheral surface.

Figure 4:
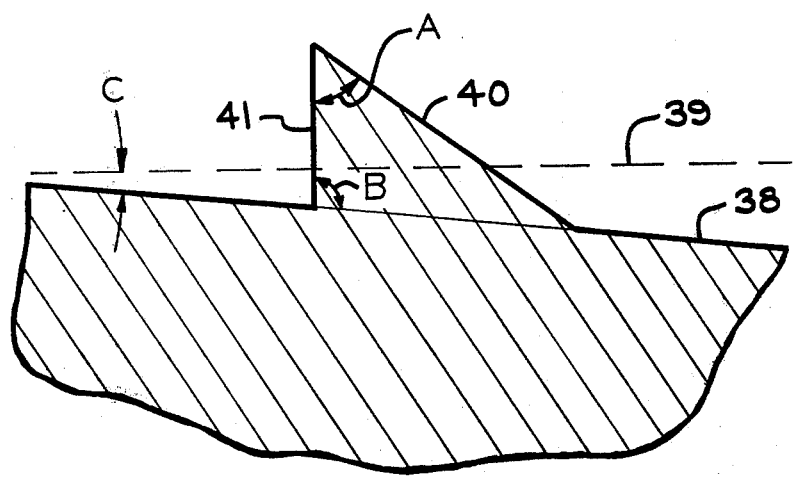
FIG. 4 diagrammatically shows the geometry of the projection cross-section and its preferred orientation with other wheel parameters.

Referring to FIG. 4, generally showing the geometry of a projecting ridge in accord with our invention, it is preferable that radially extending side 41 be normal to the wheel base line 39 which is parallel to the wheel's axial centerline. Thus base angle B between radial side 41 and the bead seat outer peripheral surface 38 may be expected to vary from approximately 84° to 96° for a 5° bead seat slope, indicated by angle C, and from 74° to 106° for a 15° bead seat rim. The 5° and 15° bead seat slopes being standard in the wheel industry.

The included angle A, between the hypotenuse 40 and the radially extending leg 41 is preferably 60° to provide a ramp, or descending surface, formed by hypotenuse 40, upon which the tire bead can slide up and over when the tire is initially inflated.

Because of the ridge's inwardly sloping hypotenuse 40, a ramp is provided over which the tire bead 19 may move relative to bead seat 13 in an axial outward direction. However, tire bead 19 is restricted from reverse movement in the inward direction. Thus by this action tire bead 19 is forced into a gripping relation between ridges 22, 23 and 24, and wheel flange 14 by pressurizing the pneumatic chamber of tire 18.

Upon loss of tire pressure, bead 19 is mechanically interlocked between flange 14 and ridges 22, 23 and 24 thus preventing disengagement of tire 18 from wheel 11 thereby providing a tire wheel assembly that will "run flat" and resist axial separation during high cornering loads.

Ridge 25 positioned inside of bead 19 and adjacent the bead toe further prevents inward movement of the bead relative to bead seat 13 by engaging the toe should any inward bead movement begin.

Figure 5:
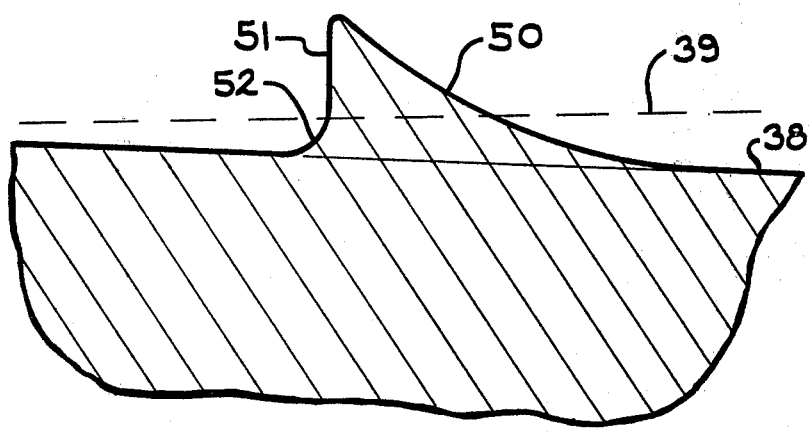
FIG. 5 shows an alternate cross-section configuration for the projection.

FIG. 5 diagrammatically shows an alternate cross-sectional configuration for our circumferential projections. The cross-section is generally of a triangular shape however fillet 50 is provided between radially projecting side 52 and the bead seat surface 38 for ease of manufacture and prevention of stress accumulation at the juncture. Further hypotenuse 50 is concave and provides a tangentially smooth intersection with bead seat surface 38. By this configuration the tire bead may more readily slide over the ramp 50 upon initial tire inflation.

Although it is preferable for ridges 22, 23, 24 and 25 to extend continuously about the bead seat circumference so as to grip tire bead throughout its full circumferential length, it may alternately be desirable for the ridges to have finite circumferential lengths with circumferential flats spaced therebetween. A suitable ridge length being approximately equal to the tire bead thickness. The presence of flats interspaced between the finite circumferential ridge lengths will tend to interrupt or otherwise re-direct the forces tending to disengage the tire bead from its interlocking relation between the ridges and the wheel flange 14. Thus the tendency of the tire bead to continue circumferential disengagement about the full wheel periphery once started, will be checked.

Figure 3:
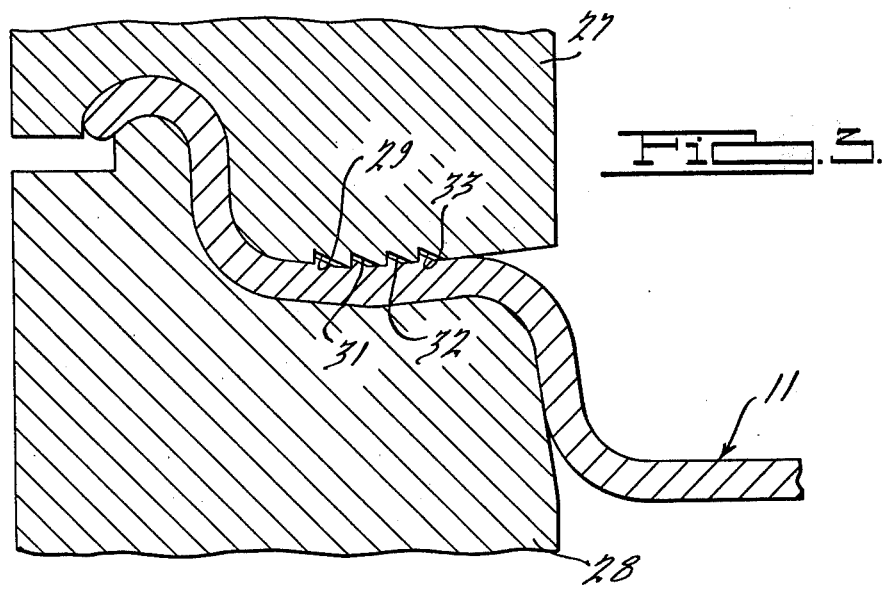
FIG. 3 is a cross-sectional view showing the method of forming of the wheel rim bead seat.

The method of forming the wheel rim 11 may be best understood by reference to FIG. 3. An initial forming of the rim 11 is accomplished prior to a final rolling operation. In this final rolling operation, the rim 11 is positioned between a plurality of rolls, only those associated with the bead seat portion 13 being illustrated for ease of understanding. It is to be understood that the bead seat 16 is formed in a similar manner. The formation of the remainder of the wheel rim 11 is conventional and need not be described.

As is conventional in wheel forming operation, the rim 11 is positioned between an outer roll 27 and an inner roll 28. The rolls 27 and 28 have facing surfaces that will, with suitable allowance for spring back, result in the desired configuration of the bead seat 13. Unlike previously proposed arrangements, however, the roll 27 is formed with reliefs 29, 31, 32 and 33 for forming the ribs 22, 23, 24 and 25, respectively. The reliefs 29, 31, 32 and 33 are of slightly greater depth than the resulting ridges 22, 23, 24 and 25, to permit spring back and to afford sufficient clearance for metal deformation. It has been found that during the rolling operation the pressure exerted by roll 28 is sufficiently great so as to cause the metal of the wheel rim 11 and particularly from the bead seat region 13 to permanently flow into grooves 29, 31, 32 and 33, of the roll 27 as in an extrusion forming process.

Thus by this forming technique the bead seat circumferential cross-sectional thickness is not undercut, weakened, or otherwise diminished.

In addition to functioning as a back up ridge engagement ridge 25 provides a surface of upset material at the axial inner periphery of the bead seat portion 13. This ridge in effect constitutes a dam that prevents inward displacement of rim metal during the rolling operation to insure sharp definition of the ridges 22, 23 and 24.

It is to be understood that the foregoing description is that of a preferred embodiment of the invention. Various changes and modifications may be made without departing from the spirit and scope of the invention as defined by the appended claims.

We claim:

1. In an automotive wheel suitable for mounting a pneumatic tire thereon having an annular rim portion with a pair of axially spaced radially outward extending annular flanges, an annular well portion intermediate said flanges and an annular imperforate bead seat portion adjacent each flange and axially spaced from said well portion, each bead seat portion having a radially outer annular surface for seating the base of each bead portion of said pneumatic tire, the improvement comprising at least one circumferentially continuous radially outward projecting protuberance rising from each annular bead seat surface such that the cross-sectional thickness of said bead set is not diminished, each protuberance comprising a radially outward projecting side, said side having at least a portion thereof normal to the wheel axial centerline and forming a base angle with the annular bead seat surface, a descending surface extending from said radially projecting side sloped radially inward and axially toward said annular well, said descending surface terminating at the intersection of said surface and the annular bead seat surface, said descending surface permitting movement of the tire bead axially thereover away from the wheel well upon inflation of said tire whereby the tire bead portion becomes locked between said radially outward extending flanges and said radially outward projecting side of said protuberance by compression of the bead elastomer therebetween.

2. The improvement of claim 1 wherein said protuberance has a triangular axial cross-section.

3. The improvement as claimed in claim 2 wherein said descending surface intersects said outer annular bead seat surface at an angle of from 14° to 46°.

4. The improvement as claimed in claim 2 wherein said descending surface intersects said radially projecting side of said protuberance at an angle of 60°.

5. The improvement of claim 1 wherein the protuberance base angle lies within the range 74° to 106°.

* * * * *